(12) United States Patent
Timken et al.

(10) Patent No.: US 8,455,708 B2
(45) Date of Patent: *Jun. 4, 2013

(54) FLEXIBLE PRODUCTION OF ALKYLATE GASOLINE AND DISTILLATE

(75) Inventors: Hye-Kyung Timken, Albany, CA (US); Shawn Winter, Salt Lake City, UT (US); Howard S. Lacheen, Richmond, CA (US); Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/725,969

(22) Filed: Mar. 17, 2010

(65) Prior Publication Data

US 2011/0226664 A1    Sep. 22, 2011

(51) Int. Cl.
*C10G 57/00* (2006.01)

(52) U.S. Cl.
USPC ........... 585/709; 585/708; 585/700; 585/302; 585/500; 585/643; 585/712; 585/727; 585/710; 208/133; 208/66

(58) Field of Classification Search
USPC ............. 585/709, 712, 721, 727, 728, 729, 585/741, 742, 743, 747, 746, 302, 6, 4, 14, 585/500, 643, 800, 802, 645; 208/133
See application file for complete search history.

(56) References Cited

U.S. PATENT DOCUMENTS

| | | | |
|---|---|---|---|
| 5,391,527 A * | 2/1995 | Kojima et al. | 502/53 |
| 6,846,405 B2 * | 1/2005 | Lattner et al. | 208/153 |
| 7,432,408 B2 | 10/2008 | Timken et al. | |
| 7,432,409 B2 | 10/2008 | Elomari et al. | |
| 7,495,144 B2 | 2/2009 | Elomari | |
| 7,553,999 B2 | 6/2009 | Elomari et al. | |
| 7,569,740 B2 | 8/2009 | Elomari | |
| 7,572,943 B2 | 8/2009 | Elomari et al. | |
| 7,572,944 B2 | 8/2009 | Elomari et al. | |
| 7,576,252 B2 | 8/2009 | Elomari et al. | |
| 7,615,598 B2 | 11/2009 | Hope et al. | |
| 2006/0131209 A1 * | 6/2006 | Timken et al. | 208/16 |
| 2007/0142690 A1 * | 6/2007 | Elomari | 585/727 |
| 2007/0249486 A1 * | 10/2007 | Elomari et al. | 502/53 |
| 2009/0107032 A1 | 4/2009 | Lacheen et al. | |

(Continued)

OTHER PUBLICATIONS

U.S. Appl. No. 12/538,746, filed Aug. 10, 2009, Elomari, et al.
U.S. Appl. No. 12/233,481, filed Sep. 18, 2008, Hommeltoft.
U.S. Appl. No. 12/335,476, filed Dec. 15, 2008, Hommeltoft, et al.
U.S. Appl. No. 12/235,487, filed Dec. 15, 2008, Lacheen, et al.

(Continued)

*Primary Examiner* — In Suk Bullock
*Assistant Examiner* — Sharon Pregler
(74) *Attorney, Agent, or Firm* — Susan M. Abernathy

(57) ABSTRACT

A process for producing hydrocarbon products, comprising: a) operating a process unit in an alkylate mode wherein greater than 50 wt % of a $C_5^+$ hydrocarbon stream from the process unit boils at 137.8° C. or below, b) adjusting one or more process conditions in the process unit, and c) after the adjusting step, operating the process unit in a distillate mode wherein greater than 50 wt % of the $C_5^+$ hydrocarbon stream from the process unit boils above 137.8° C. Also, a process unit, comprising: a) an alkylation reactor; and b) a control system that enables the alkylation reactor to be operated in the alkylate mode and in the distillate mode; wherein the alkylation reactor can switch back and forth from operating in the alkylate mode to the distillate mode.

10 Claims, 1 Drawing Sheet

Flexible Production of Alkylate Gasoline and Distillate with Ionic Liquid Catalyst

U.S. PATENT DOCUMENTS

2009/0270666 A1 10/2009 Elomari et al.
2009/0270667 A1 10/2009 Elomari et al.
2009/0306444 A1 12/2009 Elomari et al.
2010/0025292 A1 2/2010 Hommeltoft et al.
2010/0025296 A1 2/2010 Hommeltoft

OTHER PUBLICATIONS

U.S. Appl. No. 12/538,738, filed Aug. 2009, Saleh.
U.S. Appl. No. 12/610,010, filed Oct. 30, 2009, O'Rear, et al.
U.S. Appl. No. 12/468,750, filed May 19, 2009, Hommeltoft.

* cited by examiner

Flexible Production of Alkylate Gasoline and Distillate with Ionic Liquid Catalyst
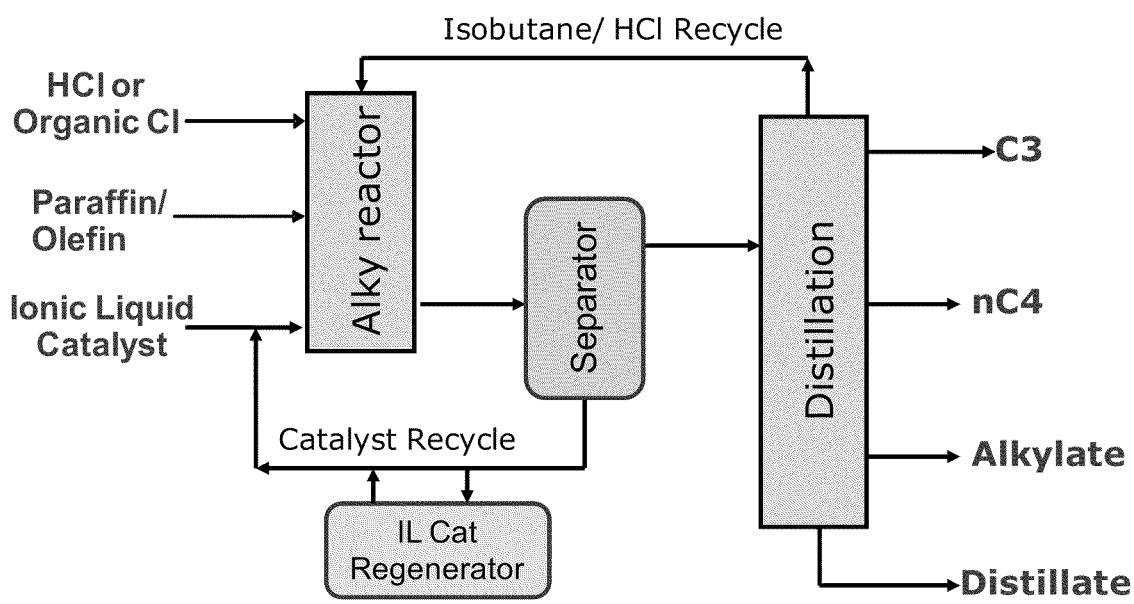

FLEXIBLE PRODUCTION OF ALKYLATE GASOLINE AND DISTILLATE

This application is related to two co-filed patent applications, titled "PROCESS FOR PRODUCING HIGH QUALITY GASOLINE BLENDING COMPONENTS IN TWO MODES" and "MARKET DRIVEN ALKYLATION OR OLIGOMERIZATION PROCESS," herein incorporated in their entireties.

TECHNICAL FIELD

This application is directed to processes for producing hydrocarbon products in an alkylate mode and a distillate mode, and to process units comprising an alkylation reactor and a control system that enables the alkylation reactor to be operated in an alkylate mode and a distillate mode.

SUMMARY

This application provides a process for producing hydrocarbon products, comprising:
a) operating a process unit in an alkylate mode wherein greater than 50 wt % of a $C_5+$ hydrocarbon stream from the process unit boils at 280° F. (137.8 degree Celsius) or below;
b) adjusting one or more process conditions in the process unit; and
c) after the adjusting step, operating the process unit in a distillate mode wherein greater than 50 wt % of the $C_5+$ hydrocarbon stream from the process unit boils above 280° F. (137.8 degree Celsius).

This application also provides a process unit, comprising:
a) an alkylation reactor; and
b) a control system that enables the alkylation reactor to be operated in an alkylate mode wherein greater than 50 wt % of a $C_5+$ hydrocarbon stream boils at 280° F. (137.8 degree Celsius) or below and in a distillate mode wherein greater than 50 wt % of the $C_5+$ hydrocarbon stream boils above 280° F. (137.8 degree Celsius); wherein the alkylation reactor can switch back and forth from operating in the alkylate mode to the distillate mode.

BRIEF DESCRIPTION OF THE DRAWINGS

FIG. 1 is a process flow diagram of an embodiment showing flexible production of alkylate gasoline and distillate with an acidic ionic liquid catalyst.

DETAILED DESCRIPTION OF THE INVENTION

In one embodiment the operating of the process unit in an alkylate mode comprises alkylating using an acidic ionic liquid catalyst. Examples of alkylation processes for making alkylate gasoline with low volatility and high octane number are described in U.S. Pat. No. 7,432,408 and US Patent Publication Number US20100025292. Other processes for alkylating using an acidic ionic liquid catalyst are described in U.S. Pat. Nos. 7,432,409; 7,495,144; 7,553,999; US Patent Publication Numbers US20090107032 and US20100025296; and patent application Ser. Nos. 12/335,476 and 12/335,487, both filed on Dec. 15, 2008.

In another embodiment, the operating of the process unit in a distillate mode comprises alkylating and oligomerizing using an acidic ionic liquid catalyst. Examples of processes to make higher boiling hydrocarbons are described in U.S. Pat. Nos. 7,572,943; 7,569,740; 7,576,252; 7,572,944; and US Patent Publication Numbers US20090306444, US 20090270667, US20090270666, and US20100025292; U.S. patent application Ser. No. 12/233,481, filed on Sep. 18, 2008, Ser. No. 12/538,738, filed on Aug. 10, 2009, Ser. No. 12/538,746, filed Aug. 10, 2009, and Ser. No. 12/610,010, filed Oct. 30, 2009.

The acidic ionic liquid catalyst used in the operating of the process unit in the alkylate mode can be the same or different from the acidic ionic liquid catalyst used in the operating of the process unit in the distillate mode. The acidic ionic liquid catalyst is composed of at least two components which form a complex. The acidic ionic liquid catalyst comprises a first component and a second component. The first component of the acidic ionic liquid catalyst can comprise a Lewis Acid selected from components such as Lewis Acidic compounds of Group 13 metals, including aluminum halides, alkyl aluminum halide, gallium halide, and alkyl gallium halide (see International Union of Pure and Applied Chemistry (IUPAC), version3, October 2005, for Group 13 metals of the periodic table). Other Lewis Acidic compounds, in addition to those of Group 13 metals, can also be used. In one embodiment the first component is aluminum halide or alkyl aluminum halide. For example, aluminum trichloride can be the first component of the acidic ionic liquid catalyst.

The second component making up the acidic ionic liquid catalyst is an organic salt or mixture of salts. These salts can be characterized by the general formula Q+A−, wherein Q+ is an ammonium, phosphonium, boronium, iodonium, or sulfonium cation and A− is a negatively charged ion such as $Cl^-$, $Br^-$, $ClO_4^-$, $NO_3^-$, $BF_4^-$, $BCl_4^-$, $PF_6^-$, $SbF_6^-$, $AlCl_4^-$, $TaF_6^-$, $CuCl_2^-$, $FeCl_3^-$, $HSO_3^-$, $RSO_3^-$, $SO_3CF_3^-$, and 3-sulfurtrioxyphenyl. In one embodiment the second component is selected from those having quaternary ammonium halides containing one or more alkyl moieties having from about 1 to about 12 carbon atoms, such as, for example, trimethylamine hydrochloride, methyltributylammonium halide, or substituted heterocyclic ammonium halide compounds, such as hydrocarbyl substituted pyridinium halide compounds for example 1-butylpyridinium halide, benzylpyridinium halide, or hydrocarbyl substituted imidazolium halides, such as for example, 1-ethyl-3-methyl-imidazolium chloride.

In one embodiment the acidic ionic liquid catalyst is selected from the group consisting of hydrocarbyl substituted pyridinium chloroaluminate, hydrocarbyl substituted imidazolium chloroaluminate, quaternary amine chloroaluminate, trialkyl amine hydrogen chloride chloroaluminate, alkyl pyridine hydrogen chloride chloroaluminate, and mixtures thereof. For example, the acidic ionic liquid catalyst can be an acidic haloaluminate ionic liquid, such as an alkyl substituted pyridinium chloroaluminate or an alkyl substituted imidazolium chloroaluminate of the general formulas A and B, respectively.

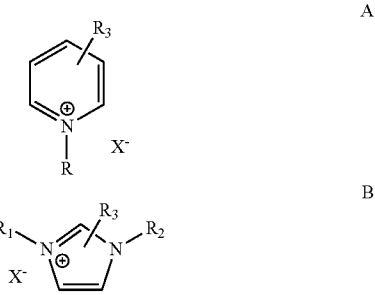

In the formulas A and B; R, $R_1$, $R_2$, and $R_3$ are H, methyl, ethyl, propyl, butyl, pentyl or hexyl group, X is a chloroaluminate. In the formulas A and B, R, $R_1$, $R_2$, and $R_3$ may or may not be the same. In one embodiment the acidic ionic liquid catalyst is N-butylpyridinium chloroaluminate.

In another embodiment the acidic ionic liquid catalyst can have the general formula RR' R" $NH^+ Al_2Cl_7^-$, wherein N is a nitrogen containing group, and wherein RR' and R" are alkyl groups containing 1 to 12 carbons, and where RR' and R" may or may not be the same.

The presence of the first component should give the acidic ionic liquid a Lewis or Franklin acidic character. Generally, the greater the mole ratio of the first component to the second component, the greater is the acidity of the acidic ionic liquid catalyst.

In one embodiment, the acidic ionic liquid catalyst is mixed in the reactor with a hydrogen halide or an organic halide. The hydrogen halide or organic halide can boost the overall acidity and change the selectivity of the acidic ionic liquid catalyst. The organic halide can be an alkyl halide. The alkyl halides that can be used include alkyl bromides, alkyl chlorides, alkyl iodides, and mixtures thereof. A variety of alkyl halides can be used. Alkyl halide derivatives of the isoparaffins or the olefins that comprise the feed streams in the alkylation process are good choices. Such alkyl halides include, but are not limited to, iospentyl halides, isobutyl halides, butyl halides, propyl halides and ethyl halides. Other alkyl chlorides or halides having from 1 to 8 carbon atoms can be also used. The alkyl halides can be used alone or in combination. The use of alkyl halides to promote hydrocarbon conversion by acidic ionic liquid catalysts is taught in U.S. Pat. No. 7,495,144 and in U.S. patent application Ser. No. 12/468,750, filed May 19, 2009.

It is believed that the alkyl halide decomposes under hydroconversion conditions to liberate Bronsted acids or hydrogen halides, such as hydrochloric acid (HCl) or hydrobromic acid (HBr). These Bronsted acids or hydrogen halides promote the hydrocarbon conversion reaction. In one embodiment the halide in the hydrogen halide or alkyl halide is the same as a halide component of the acidic ionic liquid catalyst. In one embodiment the alkyl halide is an alkyl chloride, for example t-butyl chloride. A hydrogen chloride or an alkyl chloride can be used advantageously, for example, when the acidic ionic liquid catalyst is a chloroaluminate.

The adjusting of the one or more process conditions in the process unit is done by controlling a level of a conjunct polymer in the process unit, by controlling a level of a halide containing additive in an alkylation reactor that is part of the process unit, by lowering a ratio of isoparaffin to olefin in a feed to the process unit, by increasing a reaction temperature, or by a combination thereof. In general, the higher the level of the conjunct polymer in the process unit the higher the level of the $C_5+$ hydrocarbon stream from the process unit that boils above 280° F. (137.8 degree Celsius).

In one embodiment the level of the conjunct polymer is at a lower level during the alkylate mode. The lower level, for example, can be less than 20 wt %, less than 15 wt %, less than 10 wt %, from between 5 wt % and 10 wt %, from 0 to 15 wt %, or from 0 to 10 wt %. The level is adjusted by controlling the level of the conjunct polymer to a higher level in the distillate mode, for example, above 5 wt %, above 10 wt %, above 15 wt %, above 20 wt %, above 30 wt %, or above 40 wt %. The level can be adjusted back and forth from the lower level to the higher level to switch from operating in either the alkylate mode or the distillate mode.

In one embodiment the level of the halide containing additive is adjusted upward to boost the overall acidity of conditions in the process unit to increase the total wt % of the $C_5+$ hydrocarbons. The halide containing additive can be a hydrogen halide, an organic halide, and combinations thereof. In one embodiment, the halide containing additive can be a Bronsted acid, for example, HCl, HBr, and trifluoromethanesulfonic acid. Adjusting the level of the halide containing additive can be used to switch back and forth between operating in the alkylate mode and the distillate mode. By adjusting the level of the halide containing additive to a lower level a higher level of $C_5+$ hydrocarbons in the process unit boil above 280° F. (137.8 degree Celsius). By adjusting the level of the halide containing additive to a higher level a higher level of $C_5+$ hydrocarbons in the process unit boil at 280° F. (137.8 degree Celsius) or below. The level of the halide containing additive can be adjusted by varying the molar ratio of an olefin to the halide containing additive in a feed to the process unit. Processes for adjusting the level of a halide containing additive to shift selectivity towards heavier products is taught in US Patent Publication Number US20100025292.

In other embodiments the adjusting is done by changing a ratio of isoparaffin to olefin in a feed to the process unit. In general, lowering the molar ratio of isoparaffin to olefin in the feed will produce a higher level of $C_5+$ hydrocarbons in the process unit that boil above 280° F. (137.8 degree Celsius). In one embodiment, the molar ratio of isoparaffin to olefin in the feed while operating the process unit in the alkylate mode is from 4:1 to 100:1, such as from 4:1 to 50:1, or from 4:1 to 20:1; and the molar ratio of isoparaffin to olefin in the feed while operating the process unit in the distillate mode is a lower molar ratio from that used during the alkylate mode, from 0.25:1 to 25:1, such as from 0.25:1 to 20:1, or 0.25:1 to 10:1. In a different embodiment the molar ratio of isoparaffin to olefin in the feed is approximately the same while operating in both the alkylate mode and the distillate mode.

In another embodiment, the adjusting is done by changing the reaction temperature. In general, increasing the reaction temperature will produce a higher level of $C_5+$ hydrocarbons in the process unit that boil above 280° F. (137.8 degree Celsius). In one embodiment, the reaction temperature while operating the process unit in the alkylate mode is from −40° C. to 100° C.; and the reaction temperature while operating the process unit in the distillate mode is a higher temperature, from 0° C. to 200° C. In a different embodiment the reaction temperature is approximately the same while operating in both the alkylate mode and the distillate mode.

The process can additionally comprise adjusting one or more process conditions in the process unit after operating in the distillate mode to return to operating the process unit in the alkylate mode. This can be advantageous when there is a shift in market demand, or an increased value for products produced during one of the modes.

When operating in the alkylate mode, the process generally produces greater than 50 wt % of a $C_5+$ hydrocarbon stream from the process unit that boils at 280° F. (137.8 degree Celsius) or below. In other embodiments, the process can produce greater than 55 wt %, greater than 60 wt %, greater than 70 wt %, greater than 80 wt %, greater than 90 wt % wt % of a $C_5+$ hydrocarbon stream from the process unit that boils at 280° F. (137.8 degree Celsius) or below while operating in the alkylate mode.

While operating in the distillate mode, the process generally produces greater than 50 wt % of a $C_5+$ hydrocarbon stream from the process unit that boils above 280° F. (137.8 degree Celsius). In other embodiments, the process can produce greater than 55 wt %, greater than 60 wt %, greater than 70 wt %, greater than 80 wt %, or greater than 90 wt % of a $C_5+$ hydrocarbon stream from the process unit that boils above 280° F. (137.8 degree Celsius).

In one embodiment, the $C_5+$ hydrocarbon stream from the process unit that boils at 430° F. (221 degree Celsius) or below is a gasoline blending component and the $C_5+$ hydrocarbon stream from the process unit that boils above 280° F. (137.8 degree Celsius) comprises a light distillate and a heavy distillate. A "gasoline blending component" can be either a gasoline or a naphtha hydrocarbon product suitable for blending into a gasoline. "Gasoline" is a liquid hydrocarbon used as a fuel in internal combustion engines. In the context of this disclosure, "light distillate" is a liquid hydrocarbon having a boiling range from about 280° F. to about 500° F., and "heavy distillate" is a liquid hydrocarbon having a boiling range from about 500° F. and higher. The boiling range is the 10 vol % boiling to the final boiling point (99.5 vol %), inclusive of the end points, as measured by ASTM D2887-06a and ASTM D 6352-04.

In some embodiments, the gasoline blending component can be a low volatility gasoline blending component having a Reid Vapor Pressure of 7.0 psi (4.828e+004 newtons/square meter) or less. In one embodiment the gasoline blending component has a Reid Vapor Pressure (RVP) less than 4.0 psi (2.758e+004 newtons/square meter). In one embodiment the gasoline blending component has a Reid Vapor Pressure (RVP) less than 2.8 psi (1.931e+004 newtons/square meter). In other embodiments the gasoline blending component has a RVP of 2.2 psi (1.517e+004 newtons/square meter) or less, or less than the amount defined by the equation: RVP=−0.035×(50 vol % boiling point, ° C.)+5.8, in psi. The chart of this equation is shown in FIG. 1 in US Patent Publication Number US 20100025292.

In one embodiment, the gasoline blending component has a high octane number. Examples of high octane numbers are 82 or higher, greater than 85, greater than 90, and greater than 95. Different methods are used for calculating octane numbers of fuels or fuel blend components. The Research-method octane number (RON) is determined using ASTM D 2699-07a. RON employs the standard Cooperative Fuel Research (CFR) knock-test engine. Additionally, the Research-method octane number can be calculated [RON (GC)] from gas chromatography boiling range distribution data. The RON (GC) calculation is described in the publication, Anderson, P. C., Sharkey, J. M., and Walsh, R. P., "Journal Institute of Petroleum", 58 (560), 83 (1972).

In one embodiment the process unit comprises an alkylation reactor and a control system that enables the alkylation reactor to be operated in the alkylate mode and a distillate mode, as described previously. The alkylation reactor can easily switch back and forth from operating in the alkylate mode to the distillate mode. In one embodiment, the alkylation reactor comprises an acidic ionic liquid catalyst, as described previously.

In one embodiment, the control system controls a level of conjunct polymer in an alkylation catalyst, controls a level of a halide containing additive, controls a molar ratio of isoparaffin to olefin in the alkylation reactor, controls a reaction temperature, or a combination thereof. In one embodiment the control system adjusts a temperature in a catalyst regeneration unit that connects with the alkylation reactor. By adjusting the temperature in the catalyst regeneration unit, the level of conjunct polymer in the alkylation catalyst is controlled.

As described earlier, the process unit can be switched from operating in either the alkylate mode or the distillate mode based on a market demand. In some embodiments, gasoline blending components having a high octane number, as described previously, are produced by the process unit when it is operating in both the alkylate mode and the distillate mode. In one embodiment, a second $C_5+$ hydrocarbon stream boiling at 280° F. (137.8 degree Celsius) or below, produced in the distillate mode, has a RON greater than 85 (or greater than 90), and a RVP less than 7 (or less than 4).

In one embodiment, the process unit produces a gasoline blending component, a light distillate, and a heavy distillate when the alkylation reactor is operated in the distillate mode.

In some embodiments, products produced from the $C_5+$ hydrocarbon streams in either the alkylate mode or the distillate mode have low sulfur, such as less than 25 wppm, less than 20 wppm, less than 10 wppm, or less than 5 wppm. For example, the gasoline blending component, the light distillate, and the heavy distillate can be produced having less than 25 wppm sulfur, less than 20 wppm sulfur, less than 10 wppm sulfur, or even less than 5 wppm sulfur, when the alkylation reactor is operated in the distillate mode.

The alkylation reactor can be switched back and forth from operating in the alkylate mode to the distillate mode quickly, which is advantageous when market demands or product pricing swing rapidly. For example, the alkylation reactor can switch back and forth within a month, within two weeks or less, within a week or less, within 5 days or less, within 4 days or less, within 3 days or less, within 2 days or less, or within 1 day or less.

In some embodiments, the process unit additionally comprises a hydrofinishing unit to process one or more products from the alkylating reactor. The hydrofinishing unit can process the one or more products from the alkylating reactor in one or more steps, either before or after fractionating of the one or more products from the alkylating reactor into different fractions having different boiling ranges. The hydrofinishing unit is designed to improve the oxidation stability, UV stability, and appearance of the one or more products from the alkylating reactor by removing aromatics, olefins, color bodies, and solvents. A general description of hydrofinishing can be found in U.S. Pat. Nos. 3,852,207 and 4,673,487. The hydrofinishing unit can be used to reduce the weight percent olefins in the one or more products from the alkylating reactor to less than 10, less than 5, less than 1, or less than 0.5. The hydrofinishing unit can also be used to reduce the weight percent aromatics in the one or more products from the alkylating reactor to less than 0.1, less than 0.05, less than 0.02, or less than 0.01. The hydrofinishing unit can be used to reduce the residual chloride level in the one or more products from the alkylating reactor to less than 100 ppm, less than 50 ppm, less than 10 ppm, or less than 1 ppm.

In one embodiment the control system in the process unit comprises a catalyst regeneration unit, connected to the alkylation reactor, which controls the level of the conjunct polymer in the alkylation catalyst.

The term "comprising" means including the elements or steps that are identified following that term, but any such elements or steps are not exhaustive, and an embodiment can include other elements or steps. For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

EXAMPLES

Example 1

A sample of N-butylpyridinium chloroaluminate ($C_5H_5NC_4H_9Al_2Cl_7$) ionic liquid catalyst was analyzed and had the following elemental composition. The acidic ionic liquid catalyst had aluminum chloride as a metal halide component.

| Wt % Al | 12.4 |
|---|---|
| Wt % Cl | 56.5 |
| Wt % C | 24.6 |
| Wt % H | 3.2 |
| Wt % N | 3.3 |

Example 2

Gasoline Mode

The acidic ionic liquid catalyst described in Example 1 was used to alkylate $C_4$ olefins with isobutane in a process unit. The alkylation was performed in a continuously stirred tank reactor (CSTR). An 8:1 molar ratio of isobutane to total olefin mixture was fed to the reactor via a first inlet port while vigorously stirring at approximately 1600 RPM. The acidic ionic liquid catalyst was fed to the reactor via a second inlet port, targeting to occupy 6 vol % in the reactor. A small amount of anhydrous t-butyl chloride corresponding to 60:1 molar ratio of olefin to t-butyl chloride was added to the acidic ionic liquid catalyst in the reactor. The average residence time of the combined feeds (isobutane/olefin mixture and catalyst) in the reactor was about four minutes. The outlet pressure was maintained at 200 psig and the reactor temperature was maintained at 15.6° C. (60° F.) using external cooling. The reactor effluent was separated with a coalescing separator into a hydrocarbon phase and an acidic ionic liquid catalyst phase.

A portion of the separated acidic ionic liquid catalyst phase was sent to a catalyst regeneration unit containing aluminum pellets. The catalyst regeneration unit comprised a regeneration reactor that was adjusted within a range from 76.7 to 110° C. (170 to 230° F.) to maintain the conjunct polymer level in the alkylation catalyst from 5 to 10 wt %.

The hydrocarbon phase was then sent to a series of three distillation columns to separate $C_5^+$, n-butane, $C_3^-$ offgas and isobutene recycle streams. The $C_5^+$ stream was analyzed using gas chromatography for detailed hydrocarbon analysis and D86 laboratory distillation. Research Octane number was calculated based on GC composition and Research Octane number of pure compounds assuming volumetric linear blending. The resulting $C_5^+$ stream was an alkylate gasoline having a 95 RON. ASTM D86 distillation of the $C_5^+$ stream showed the initial boiling point of 86° F. (30 degree Celsius), $T_{50}$ boiling point of 223° F. (106.1 degree Celsius), $T_{90}$ boiling point of 284° F. (140 degree Celsius) and the end boiling point of 404° F. (206.7 degree Celsius). These results indicated that the process generated high quality alkylate gasoline that can be readily blended to the refinery gasoline pool.

Example 3

Distillate Mode

Experimental conditions that were nearly identical to those of Example 2 were followed, except that the regeneration temperature was adjusted to allow the conjunct polymer level in the alkylation catalyst to be maintained at a higher level of about 20 wt %. As in Example 2, the hydrocarbon phase was sent to a series of three distillation columns to separate $C_5^+$, n-butane, $C_3^-$ offgas and isobutene recycle streams. The $C_5^+$ stream was analyzed using the ASTM D2887 SimDist chromatography method. D2887 SimDist results showed $T_{10}$ boiling point of 73° F. (22.78 degree Celsius) (contains some light material), $T_{50}$ point of 343° F. (172.8 degree Celsius), $T_{90}$ point of 648° F. (342.2 degree Celsius) and the end point of 873° F. (467.2 degree Celsius). Weight percent yields of hydrocarbon fuel product streams were estimated using the GC data and results are summarized in Table 1.

TABLE 1

Estimated $C_5^+$ Product Distribution for "Distillate Mode"

|  | wt % | vol % | density |
|---|---|---|---|
| Naphtha, C5 - 280 F. | 34.1 | 36.8 | 0.70 |
| Light distillate, 280 F.-500 F. | 33.2 | 32.6 | 0.77 |
| Heavy distillate, 500 F. - EP | 32.7 | 30.5 | 0.81 |
| Sum, % | 100.0 | 100.0 |  |

Results in Examples 1 and 2 demonstrate that for the "Gasoline Mode", essentially all, about 100%, of the $C_5^+$ stream is gasoline boiling range material. For the "Distillate Mode", about 60+ wt % of the $C_5^+$ stream is distillate material boiling in the range of either light distillate (kerosene and jet) or heavy distillate (diesel).

The process unit was operated in the "distillate mode" for one week. Then the used catalyst was drained and fresh catalyst was added to make the conjunct polymer level of the blend alkylation catalyst to be at about 5-10 wt % conjunct polymer. Once the level of conjunct polymer level was reduced to be within about 5 to 10 wt %, the $C_5^+$ stream became lighter boiling range material alkylate gasoline. This change back from "distillate mode" to "alkylate mode" occurred within two days.

Example 4

Product Properties of Alkylate Gasoline and Distillate Using $C_4$ Olefin/Isobutane Feeds in "Distillate Mode"

The $C_5^+$ stream from Example 3 was distilled in a laboratory into gasoline, light distillate (kerosene and jet) and heavy distillate (diesel) fractions. Product properties of each fraction are summarized in Table 2.

TABLE 2

Product Properties of Gasoline and Distillate Streams

| | |
|---|---|
| Gasoline Properties | |
| F-1 Research Octane (RON) | 95 |
| F-2 Motor Octane (MON) | 91 |
| Specific Gravity, g/cc | 0.70 |
| Reid Vapor Pressure | 3.6 |
| Sulfur, ppm | 3 |
| Light Distillate Properties, as produced | |
| Flash point, ° F. | ~100 |
| Freeze point, ° F. | <−76 |
| Cloud point, ° F. | <−76 |
| Cetane number | ~30 |
| Bromine number | ~70 |
| Specific Gravity, g/cc | 0.77 |
| Sulfur, ppm | 3 |
| Heavy Distillate Properties, as produced | |
| Freeze point, ° F. | <−76 |
| Cloud point, ° F. | <−76 |
| Cetane number | ~30 |
| Bromine number | ~60 |
| Specific Gravity, g/cc | 0.82 |
| Sulfur, ppm | 18 |

The product property data indicated the process makes very high quality alkylate gasoline with excellent octane numbers, low vapor pressure, and low sulfur.

Additionally, the distillate fractions showed excellent freeze and cloud points indicating these streams can be used to improve the characteristics of kerosene, jet, or diesel blends. The light and heavy distillate fractions showed 60-70 Bromine numbers indicating the fractions contain unsaturated olefins. Thus it can be desirable to send these streams to a hydrofinishing unit to saturate the olefins and to remove any other undesirable impurities or materials.

What is claimed is:

1. A process for producing hydrocarbon products, comprising:
   a) reacting butene and isobutane with an acidic ionic liquid catalyst in a process unit;
   b) operating the process unit in an alkylate mode wherein greater than 50 wt % of a $C_5^+$ hydrocarbon stream from the process unit boils at 280° F. (137.8 degree Celsius) or below;
   c) adjusting one or more process conditions in the process unit by controlling a level of a conjunct polymer above 10 wt % in the acidic ionic liquid catalyst; and
   d) after the adjusting step, operating the process unit in a distillate mode wherein greater than 50 wt % of the $C_5^+$ hydrocarbon stream from the process unit boils above 280° F. (137.8 degree Celsius).

2. The process of claim 1, wherein the operating of the process unit in an alkylate mode comprises alkylating using the acidic ionic liquid catalyst.

3. The process of claim 1, wherein the operating of the process in a distillate mode comprises alkylating and oligomerizing using the acidic ionic liquid catalyst.

4. The process of claim 3, wherein the acidic ionic liquid catalyst is selected from the group consisting of hydrocarbyl substituted pyridinium chloroaluminate, hydrocarbyl substituted imidazolium chloroaluminate, quaternary amine chloroaluminate, trialkyl amine hydrogen chloride chloroaluminate, alkyl pyridine hydrogen chloride chloroaluminate, and mixtures thereof.

5. The process of claim 1, wherein the adjusting additionally comprises controlling a level of a halide containing additive in an alkylation reactor that is part of the process unit, changing a molar ratio of isoparaffin to olefin in a feed to the process unit, changing a reaction temperature, or a combination thereof.

6. The process of claim 1, wherein the adjusting is done by controlling the level of the conjunct polymer in the alkylation catalyst in the process unit above 13 wt %.

7. The process of claim 1, additionally comprising adjusting one or more process conditions in the process unit after operating in the distillate mode to return to operating the process unit in the alkylate mode.

8. The process of claim 1, wherein while operating the process unit in the alkylate mode greater than 80 wt % of a $C_5^+$ hydrocarbon stream from the process unit boils at 280° F. (137.8 degree Celsius) or below.

9. The process of claim 1, wherein while operating the process unit in the distillate mode greater than 60 wt % of the $C_5^+$ hydrocarbon stream from the process unit boils above 280° F. (137.8 degree Celsius).

10. The process of claim 1, wherein the $C_5^+$ hydrocarbon stream from the process unit that boils at 280° F. (137.8 degree Celsius) or below is a gasoline blending component and the $C_5^+$ hydrocarbon stream from the process unit that boils above 280° F. (137.8 degree Celsius) comprises a light distillate and a heavy distillate.

* * * * *